Feb. 8, 1949.                    C. PITON                     2,461,441
           DEVICE FOR SECURING AN ELEMENT OF AN OSCILLATING
                    ELECTRIC CIRCUIT TO A SUPPORT
                        Filed Nov. 19, 1946

INVENTOR
CHARLES PITON
BY Young, Emery & Thompson
           ATTYS

Patented Feb. 8, 1949

2,461,441

UNITED STATES PATENT OFFICE 2,461,441

DEVICE FOR SECURING AN ELEMENT OF AN OSCILLATING ELECTRIC CIRCUIT TO A SUPPORT

Charles Piton, Geneva, Switzerland, assignor to Hermann Thorens S. A., a corporation of Switzerland Application November 19, 1946, Serial No. 710,786
In Switzerland August 19, 1944

6 Claims. (Cl. 174—138)

The present invention relates to a securing and insulating device, particularly for the purpose of being used in the construction of radio-electric apparatus, induction coils, high frequency transformers and so forth, in all cases where it is desired to secure an element of an oscillating electrical circuit and to insulate it relatively to the latter, in a desired position on a support.

The majority of the devices of this character which have been constructed hitherto have been provided with members of insulating material assembled by means of securing devices with a screw thread, such as bolts or screws and nuts. The use of members with a screw thread have the disadvantage that the tightening of these members gives rise to forces which cannot be controlled, which may be prejudicial to the insulating material, which is generally fragile, and produce tensions both in the element to be secured to the support, which tensions are liable to cause a subsequent movement between the two parts.

The device forming the subject of the present invention tends to eliminate the disadvantages referred to. It is distinguished in that it has at least two securing members, of insulating material, each sliding in a groove provided in a part of the element of the oscillating circuit, the securing members having at one end thereof a connecting member adapted to be secured to the support, a device being provided for preventing any movement of the securing members perpendicularly to the axis of the groove.

A form of construction of a device, forming the subject of the invention, is shown by way of example in the accompanying drawing, wherein.

Figure 1:
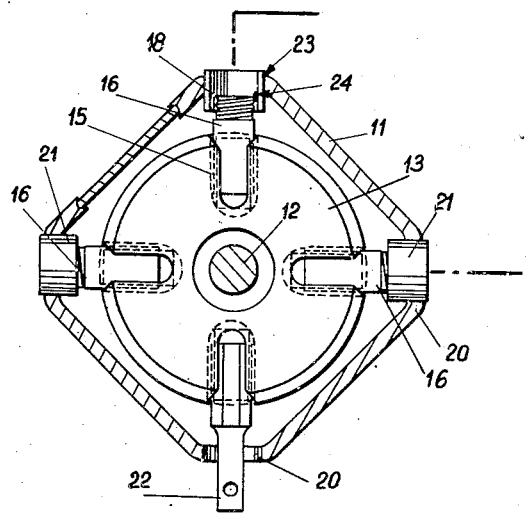
Fig. 1 is a cross-section of the device.
Figure 2:
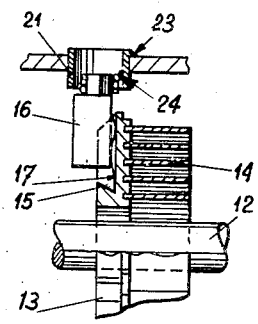
Fig. 2 is a longitudinal section of the device.
Figure 3:
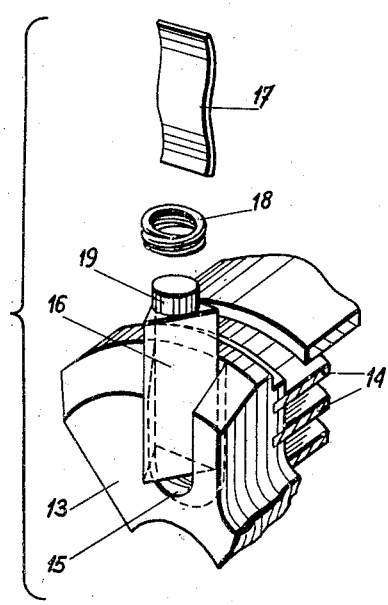
Fig. 3 shows a perspective view of the various elements forming the device.

The example shown in the drawing is applied to the construction of a variable condenser formed by a stationary armature and a movable armature, the armatures being provided with electrodes in the form of concentric cylinders, the electrodes of the movable armature projecting between those of the stationary armature.

In a casing 11 is mounted a spindle 12 supporting the movable armature, not shown. The stationary armature is formed by a circular plate 13 provided with a series of electrodes 14 in the form of concentric cylinders of revolution. In the thickness of the plate 13 are milled four grooves 15 of dove-tailed cross-section and arranged radially. The stationary armature is secured to the casing 11 by means of three insulators 16 of triangular cross-section each sliding in one of the grooves 15. A cambered blade spring 17, located in each of the grooves between the bottom of the groove and the insulator, causes the insulator to bear against the lateral faces of the groove and thus prevents any movement thereof perpendicularly to the axis of the groove. Each of the insulators 16 is provided with a connecting member 18 formed by a few turns of a coiled spring so dimensioned as to hold by tightening on a cylindrical part 19 provided at one of the ends of each of the insulators. The casing 11 is provided with four openings 20 located opposite the grooves 15. In three of the openings are seated ferrules 21 with which the connecting members 18 engage with considerable clearance. Finally the fourth groove 15 serves as a seating for a terminal 22 serving to ensure connection between the circular plate 13 and a point outside the casing.

The placing in position of the device applied to the variable condenser is effected in the following manner: The three insulators 16, fitted with their connecting member 18, are engaged with the grooves 15 at the same time as the cambered springs 17. The complete stationary armature is then introduced into the casing 11 and arranged co-axially with the movable armature, not shown. When the centering has been effected, the three ferrules 21 are secured to the casing by means of a blob of solder at 23 and the stationary armature is secured to the casing by blobs of solder at 24 between the connecting members and the ferrules. By reason of the clearance provided between the latter, the stationary armature may be brought into the desired position relatively to the movable armature before being locked relatively to the casing. It now only remains to insert the terminal 22 into the fourth groove.

The device described has the advantage of not being provided with any element having a screw thread. The insulators are only subjected to forces, determinable with precision, by the springs 17 and 18. The element to be secured may be brought into a desired position relatively to its support by reason of the fact that the insulators may slide in their grooves and as considerable clearance is provided between the connecting members and the ferrules. Finally as the securing between the latter is effected by a blob of solder any danger of tension between the elements to be assembled is eliminated. Two insulators, which are not parallel, suffice to lock an element on its support.

It will be understood that the securing element of insulating material may have any shape which enables it to slide in a groove and that means other than the cambered spring 17 may be provided for preventing any movement of this securing member perpendicularly to the axis of the groove. Similarly the connecting member may be of any other shape and be secured to the support by means other than a blob of solder.

I claim:

1. In an element of an oscillating electrical circuit, said element having a part provided with at least two elongated grooves of polygonal cross section and a support for said part, at least two securing members of insulating material each mounted with play in a groove for longitudinal sliding movement, a connecting member connecting one end of each securing member to said support, and means for maintaining said sliding securing members in permanent contact with at least two of the walls of said grooves in a manner to prevent movement of said members in said grooves in directions perpendicularly to the axis of sliding.

2. In an element of an oscillating electrical circuit, said element having a part provided with at least two elongated grooves of dovetail cross section and a support for said part, at least two securing members of insulating material of triangular cross section, each mounted with play in a groove for longitudinal sliding movement, a connecting member connecting one end of each securing member to said support, and means for maintaining said sliding securing members in permanent contact with at least two of the walls of said grooves in a manner to prevent movement of said members in said grooves in directions perpendicularly to the axis of sliding.

3. In an element of an oscillating electrical circuit, said element having a part provided with at least two elongated grooves of dovetail cross section and a support for said part, at least two securing members of insulating material of triangular cross section, each mounted with play in a groove for longitudinal sliding movement, a connecting member connecting one end of each securing member to said support, and a cambered blade spring located in each groove between the securing members therein and the bottom of the groove between the securing members therein and the bottom of the groove to press the securing member against the lateral faces of the groove in a manner to prevent movement of said members in said grooves in directions perpendicularly to the axis of sliding.

4. In an element of an oscillating electrical circuit, said element having a part provided with at least two elongated grooves of dovetail cross section and a support for said part, at least two securing members of insulating material of triangular cross section, each mounted with play in a groove for longitudinal sliding movement, a connecting member connecting one end of each securing member to said support, and means for maintaining said sliding securing members in permanent contact with at least two of the walls of said grooves in a manner to prevent movement of said members in said grooves in directions perpendicularly to the axis of sliding, said connecting members being formed of coil springs resiliently gripping a portion of said securing members.

5. In an element of an oscillating electrical circuit, said element having a part provided with at least two elongated grooves of dovetail cross section and a support for said part, at least two securing members of insulating material of triangular cross section, each mounted with play in a groove for longitudinal sliding movement, a connection member in the form of coil springs resiliently gripping the ends of the securing members, and solder connecting the coil springs to said support for connecting one end of each securing member to said support, and means for maintaining said sliding securing members in permanent contact with at least two of the walls of said grooves in a manner to prevent movement of said members in said grooves in directions perpendicularly to the axis of sliding.

6. In an element of an oscillating electrical circuit, said element having a part provided with at least two elongated grooves of dovetail cross section and a support for said part, at least two securing members of insulating material of triangular cross section, each mounted with play in a groove for longitudinal sliding movement, a connecting member in the form of coil springs resiliently gripping the ends of the securing members, and solder connecting the coil springs to said support for connecting one end of each securing member to said support and a cambered blade spring located in each groove between the securing member therein and the bottom of the groove to press the securing member against the lateral faces of the groove in a manner to prevent movement of said members in said grooves in directions perpendicularly to the axis of sliding.

CHARLES PITON.

REFERENCES CITED

The following references are of record in the file of this patent:

UNITED STATES PATENTS

| Number | Name | Date |
|---|---|---|
| 2,101,985 | Cramer | Dec. 14, 1937 |
| 2,156,449 | Cohen | May 2, 1939 |
| 2,192,936 | Rodgers | Mar. 12, 1940 |